United States Patent
Epifani et al.

(10) Patent No.: US 9,088,900 B2
(45) Date of Patent: Jul. 21, 2015

(54) METHOD AND SYSTEM FOR OPTIMIZING THE CONFIGURATION OF A WIRELESS MOBILE COMMUNICATIONS NETWORK

(75) Inventors: Francesco Epifani, Turin (IT); Indro Moreno Francalanci, Turin (IT)

(73) Assignee: Telecom Italia S.p.A., Milan (IT)

( * ) Notice: Subject to any disclaimer, the term of this patent is extended or adjusted under 35 U.S.C. 154(b) by 716 days.

(21) Appl. No.: 12/811,228

(22) PCT Filed: Dec. 31, 2007

(86) PCT No.: PCT/EP2007/064649
§ 371 (c)(1),
(2), (4) Date: Jun. 30, 2010

(87) PCT Pub. No.: WO2009/083035
PCT Pub. Date: Jul. 9, 2009

(65) Prior Publication Data
US 2010/0285788 A1    Nov. 11, 2010

(51) Int. Cl.
*H04W 24/02*    (2009.01)
*H04W 16/18*    (2009.01)
*H04W 24/06*    (2009.01)

(52) U.S. Cl.
CPC .............. *H04W 24/02* (2013.01); *H04W 16/18* (2013.01); *H04W 24/06* (2013.01)

(58) Field of Classification Search
CPC ..... H04W 24/00; H04W 24/06; H04W 16/18; H04W 24/02
USPC ............ 370/252, 254; 455/67.11, 403, 422.1, 455/423, 446, 451, 456.1, 457
See application file for complete search history.

(56) References Cited

U.S. PATENT DOCUMENTS

| | | | |
|---|---|---|---|
| 6,085,335 A * | 7/2000 | Djoko et al. | 714/26 |
| 6,141,565 A | 10/2000 | Feurerstein et al. | |
| 6,522,888 B1 | 2/2003 | Garceran et al. | |
| 2003/0186693 A1 | 10/2003 | Shafran et al. | |
| 2004/0014476 A1* | 1/2004 | Barberis et al. | 455/446 |
| 2005/0003842 A1 | 1/2005 | Harju et al. | |
| 2005/0288009 A1 | 12/2005 | Poletti | |
| 2006/0224375 A1* | 10/2006 | Barnett et al. | 703/22 |

FOREIGN PATENT DOCUMENTS

| | | | | |
|---|---|---|---|---|
| EP | 1718089 A1 * | 11/2006 | | H04Q 7/34 |
| WO | 02/10942 A1 | 2/2002 | | |
| WO | 02/11478 A1 | 2/2002 | | |
| WO | 02/35872 A1 | 5/2002 | | |
| WO | 02/43428 A1 | 5/2002 | | |
| WO | 03/049479 A1 | 6/2003 | | |
| WO | 2007/071271 A1 | 6/2007 | | |

OTHER PUBLICATIONS

International Search Report dtd Sep. 19, 2008, PCT/EP2007/064649.

* cited by examiner

*Primary Examiner* — Dinh P Nguyen
(74) *Attorney, Agent, or Firm* — Banner & Witcoff, Ltd.

(57) ABSTRACT

A method of upgrading a wireless mobile communications network deployed in the field, including capturing network events from the wireless mobile communications network; obtaining network simulation data from an automated network simulation planning tool; combining the captured network events and the network simulation data to derive diagnostic indicators adapted to evidence criticalities in a current network configuration; and modifying the current network configuration to overcome the criticalities.

20 Claims, 7 Drawing Sheets

METHOD AND SYSTEM FOR OPTIMIZING THE CONFIGURATION OF A WIRELESS MOBILE COMMUNICATIONS NETWORK

CROSS REFERENCE TO RELATED APPLICATIONS

This is a U.S. National Phase Application under 35 U.S.C. §371 of International Application No. PCT/EP2007/064649, filed Dec. 31, 2007, which was published Under PCT Article 21(2), the entire contents of which are incorporated herein by reference.

BACKGROUND OF THE INVENTION

1. Field of the Invention

The present invention generally relates to wireless mobile communications network like cellular telephony networks (particularly, although not limitatively, second-generation networks like GSM—General System for Mobile communications—networks and third-generation networks like UMTS—Universal Mobile Telecommunications System—networks, and equivalent standards).

2. Description of the Related Art

A wireless mobile communications network needs from time to time to be upgraded for meeting changing coverage and handled traffic demands. This also applies to relatively mature networks like GSM networks.

The need of upgrading a wireless mobile communications network may for example derive from the necessity of eliminating geographic areas that are subject to excessive interference, so as to achieve a better quality of service, tracking the changing distribution on the territory of the users, ensuring the coverage of geographic areas that are still uncovered (ensuring in particular adequate signal coverage in indoor, in-car, outdoor conditions).

Upgrading a wireless mobile communications network involves planning the changes to be made to the network's cells parameters before deploying the upgrades.

Several network planning tools are known in the art, which are used by network designer for planning wireless mobile communications networks before their deployment on the field.

Generally, the goal of the network planning is ensuring that radio resources are available (with a satisfactory quality of service) in respect of a set of network services in a target geographic area. This goal is reached if, in each area element (pixel) of the target area the generic mobile terminal receives network's common channels signals with a sufficient quality (this being a precondition for allowing the mobile terminal perceiving the presence of the network and selecting the network cell to attach to), the signals transmitted in uplink by the mobile terminal are received with a sufficient quality by the transceiver stations of the network, and the signals transmitted in downlink by the transceiver stations of the network are received with a sufficient quality by the mobile terminal.

Different indicators may be used to assess the above conditions, depending on the network type. For example, in the case of a GSM network, an indicator is the electric field value (or the received signal strength) in the generic pixel of the target area, and the signal-to-noise ratio (C/I). In the case of a UMTS network, which as known exploits a Code Division Multiple Access (CDMA) modulation technique, indicators similar to those exploited for a GSM network are used for signaling channels (like the Common Pilot Channel—CPICH—, a channel that is not subjected to power control), but further considerations are made for taking into account the aspects of macrodiversity (i.e. the possibility that a mobile terminal is simultaneously connected to several transceiver stations) and power control in uplink and downlink. Another peculiarity of UMTS networks is that while in a GSM network the network capacity per transceiver station is fixed a priori (depending on the number of radio carriers assigned to the transceiver station), this is not true for a UMTS network, wherein the capacity depends, in addition to the radio resources assigned to the generic transceiver station, also on the peculiar signal propagation and interference that are experienced in a network cell; for this reason, the network capacity analysis is performed contextually to the analysis of the interference and signal power.

In the planning of the network before its deployment, a-knowledge of the actual traffic handled by the network in the target area is by definition missing; the network planning may thus be made under the assumption of zero handled traffic. This may be a problem for networks like UMTS networks, in which, as discussed above, the aspects of the interference are closely related to the handled traffic. For this reason, a tuning or re-planning of the network parameters is necessary after the network has been deployed on the field.

Generally, the network re-planning involves having the network manager running a "drive test" to collect measures from the deployed network useful to identify areas where the deployed network exhibits criticalities (for example, an area where calls drops occurs due to absence of network signal or pilot pollution—a phenomenon taking place when the number of different transceiver station signals received in a generic pixel with a strength above the macrodiversity threshold, and for which the Ec/Io (energy to noise and interference ratio) of the CPICH is higher than a predetermined threshold, exceeds the maximum number of transceiver stations to which the generic mobile terminal can connect in macrodiversity). Using the collected measures, the network manager performs a network simulation conducted exploiting an automated network planning tool; if the results of the simulation evidence similar criticalities as those evidenced by the measures collected by means of the drive test, the network manager, using the network planning tool, examines possible changes to be made to the deployed network, evaluating the effects thereof on the global network performance (not only in the critical areas). The network manager then selects the change that represents a good trade-off in terms of costs-benefits, and the deployed network is modified accordingly. Then, running a new drive test, the effectiveness of the changes is evaluated.

WO 02/11478 discloses a system for monitoring the performances of mobile telephony networks. In a system for checking performance quality of mobile telephony networks, specific electronic devices are connected to digital data transmission lines between base stations controllers (BSCs) and base transmitting stations (BTSs) dedicated to peripheral areas, or cells, such devices being apt to acquisition of data transmitted onto said lines and to process said data for identification of specific network operating parameters and for correlation of said parameter between them. The above electronic devices are also connected to central processing units where the above processed data are periodically transmitted to for later searching and processing according to design and network maintenance requirements, or any other requirement of users connected by means of remote terminals to said central units. In particular, the hardware of the system allows extracting from the interface between the BTSs and the BSCs network messages formed by a message part related to the type of event characterizing the measure, for example channel request or measurement ratio, and by another message part carrying service parameters like the electromagnetic field level, the distance from the BTS, the quality of service. The software of the system allows arranging the measures in such a way as to build tables of statistical indicators by correlating various available data (e.g., the electromagnetic field level and the quality of service). The data can be correlated in different ways, depending on the estimations needed by the network planner, who may have to face problems of network's expansion or maintenance of the deployed network.

U.S. Pat. No. 6,522,888 discloses a system for determining wireless coverage using location information for a wireless unit. The disclosed system uses location information for a wireless unit and collects information on communications between the wireless unit and the wireless communications system in association with the location information. The wireless communications system determines and/or receives location information for the wireless unit along with other information associated with the location information. The information by location can be used to represent the coverage of a geographic region. For example, during communications between a serving base station and a wireless unit, the serving base station could receive and/or determine signal quality measurements of a forward link and/or of a reverse link at a particular location. Additionally, neighboring base stations can monitor the communications and determine and/or receive location information for the location of the wireless unit along with the information associated with or corresponding to the location of the wireless unit. The associated information can be linked with additional parameters, such as wireless unit type, wireless unit identity, frequency, operating conditions and/or base station identity.

SUMMARY OF THE INVENTION

The Applicant has observed that the known network planning methods are tailored on the planning of a network before its deployment, and are not efficient for the upgrading of an already deployed network.

Concerning the system for monitoring the performances of mobile telephony networks disclosed in WO 2002/11478, the Applicant has observed that its main drawback resides in that the statistical indicators lacks any geographic position reference: the network events are only characterized by an indication of the network cell to which they relate, and of the distance therefrom, but lack geographic position data like the latitude and the longitude. An additional drawback is that there is no control on the statistical reliability of the data obtained.

Concerning the system disclosed in U.S. Pat. No. 6,522, 888, a drawback is that only the results of measures are used. Additionally, for the implementation of the system modifications on both the network apparatuses and the mobile terminals may be required.

The Applicant believes that it would be advantageous, from the viewpoint of the radio resources exploitation, perceived quality of service and deployment of new services, to enhance conventional network planning tools in order to allow a real-time, automatic re-planning, in respect of at least some network parameters, for example automating the re-planning procedure outlined in the foregoing.

The availability of a re-planning tool of a network already deployed on the field might be of particular advantage for UMTS or similar networks, in which the network planning is strongly conditioned by the knowledge of the traffic handled by the network: the knowledge of the real traffic handled by the deployed network could allow adapting the network configuration to the real needs.

The Applicant has found that an efficient automated network re-planning method can be to exploit, suitably merging them, data related to events detected in the network on the field and network simulation data, generated by an automated network planning tool. By merging these data, diagnostic indicators are determined, which provide a reliable indication of the causes of the network events and thus allow identifying network criticalities, to be overcome by properly upgrading the network configuration.

According to an aspect of the present invention, a method is provided of upgrading a wireless mobile communications network deployed on the field, comprising:
    capturing network events from the wireless mobile communications network;
    obtaining network simulation data from an automated network simulation planning tool;
    combining the captured network events and the network simulation data to derive diagnostic indicators adapted to evidence criticalities in a current network configuration; and
    modifying the current network configuration to overcome the criticalities.

The method may further comprise calculating network events statistical indicators based on the captured network events, and said combining may comprise combining the network simulation data with the calculated statistical indicators.

The method may further comprise localizing, in the geographic area covered by the wireless mobile communications network, the captured network events, and said calculating network events statistical indicators may comprise using geographically-localized captured network events.

Said localizing the captured network events may comprise determining elementary area of a geographic area covered by the wireless mobile communications network wherein the captured network events occurred.

Said combining may comprise calculating degrees of correlation between the captured network events and the network simulation data, said degrees of correlation being calculated by correlating the captured network events to the current network configuration.

Said calculating degrees of correlation may comprise making discrete and normalizing values of said network simulation data.

Said network events may comprise one or more among calls drops, lost calls, network traffic, handovers from a cell to another cell.

Said diagnostic indicators may be calculated in respect of area elements of a geographic area covered by the wireless mobile communications network. The diagnostic indicators may be differentiated based on an indication of a level of urbanization of an area covered by the wireless mobile communications network. Aggregated diagnostic indicators in respect of areas covered by network cells may also be calculated.

According to an aspect of the present invention, a system is provided for upgrading a wireless mobile communications network deployed on the field, adapted to:
    obtaining network events captured from the wireless mobile communications network;
    obtaining network simulation data from an automated network simulation planning tool;
    combining the captured network events and the network simulation data to derive diagnostic indicators adapted to evidence criticalities in a current network configuration; and causing the current network configuration to be modified to overcome the criticalities.

The system may, further comprise a statistical indicators calculator adapted to calculating network events statistical indicators based on the captured network events, to be combined with the network simulation data.

The system may further comprise a localization platform adapted to localize, in the geographic area covered by the wireless mobile communications network, the captured network events. Said localization platform may be adapted to determine elementary area of the geographic area covered by the wireless mobile communications network wherein the captured network events occurred.

Said combining may comprise calculating degrees of correlation between the captured network events and the network simulation data, said degrees of correlation being calculated by correlating the captured network events to the current network configuration.

Said calculating degrees of correlation may comprise making discrete and normalizing values of said network simulation data.

Said network events may comprise one or more among calls drops, lost calls, network traffic, handovers from a cell to another cell.

Said diagnostic indicators may be calculated in respect of area elements of a geographic area covered by the wireless mobile communications network. The diagnostic indicators may be differentiated based on an indication of a level of urbanization of an area covered by the wireless mobile communications network. Aggregated diagnostic indicators in respect of areas covered by network cells may also be calculated.

Thanks to the method and system according to the present invention, statistical indicators obtained based on the results of measures on the network on the field are combined with simulation data derived from a network planning tool to perform an automatic diagnosis of the network. The diagnostic indicators obtained by combining the statistical indicators and the simulation data are adapted to provide indications about the network quality, by correlating possible problems evidenced by the statistical indicators derived from the measures and possible causes of these problems derived from a network planning tool. The diagnostic indicators are useful to identify the changes to be made to the network configuration, particularly to the network's cells parameters (transmission power, azimuth, electrical and/or mechanical tilt, antennas' radiation pattern), so as to reduce or eliminate the evidenced network criticalities and consequently improve the service coverage and quality.

BRIEF DESCRIPTION OF THE DRAWINGS

These and other features and advantages of the present invention will be made clear by the following detailed description of an embodiment thereof, provided merely by way of non-limitative example, which will be conducted making reference to the attached drawings, wherein:

FIGS. 2A to 2L depicts vote assignment functions used in an embodiment of the present invention for normalizing, by assigning votes, quantities expressing parameters indicating network's performance (performance indicators) obtained through an automated network planning tool.

DETAILED DESCRIPTION OF AN EMBODIMENT OF THE INVENTION

Figure 1:
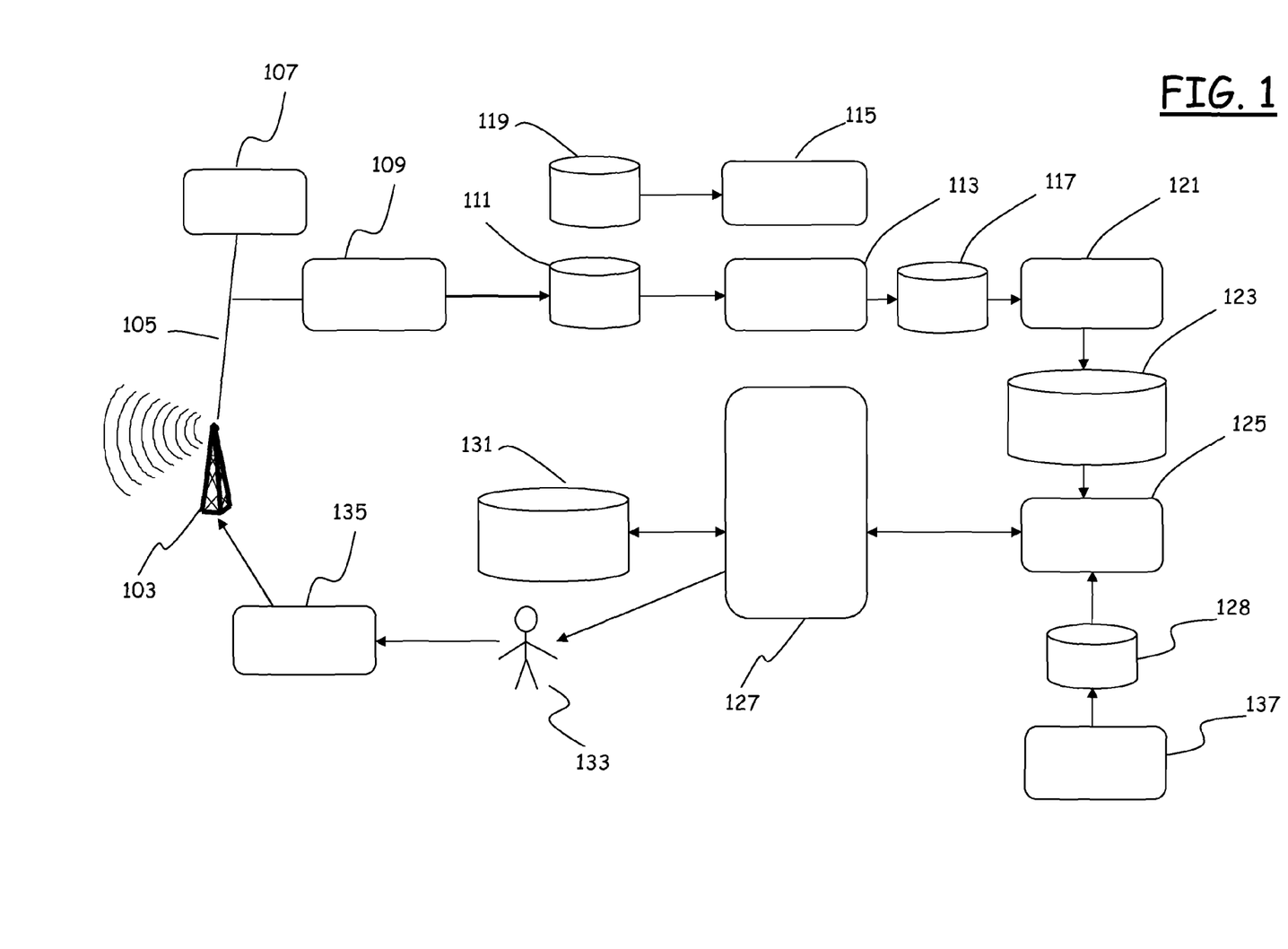
FIG. 1 is a schematic block diagram of a system according to an embodiment of the present invention.

Making reference to the drawings, in FIG. 1 a schematic block diagram is provided of a system according to an embodiment of the present invention.

In the figure, reference numeral 103 denotes a transceiver station of a wireless mobile communications network already deployed on the field, for example a BTS of a GSM network, or a Node-B of a UMTS network. It is intended that the wireless mobile communications network typically comprises several such transceiver stations, despite only one transceiver station is shown in the drawing for the sake of simplicity.

The transceiver station 103 is connected, through a network connection 105, to a controller 107, which may for example be a BSC of a GSM network or an RNC (Radio Network Controller) of a UMTS network, and that controls the transceiver station 103 (and other similar transceiver stations).

Block 109 denotes transducers that are coupled to the network connection 105 and which are adapted to capture relevant network events, for example by exploiting hardware probes placed at the interface between the transceiver station 103 and the controller 107 (for example, the "Abis" interface, in the case of a GSM network). The captured network events may include for example calls drops, lost calls, network traffic, handovers from a cell to another, and are stored in a database 111 of network events to be geographically localized. Several solutions exist that allow downloading the network events from the interface between the transceiver stations and the respective controllers, e.g. the Abis interface; one of these solutions is for example described in WO 2002/11478.

The system according to a preferred embodiment of the present invention comprises a geographic localization engine, adapted to derive the geographic localization of the captured network events. The geographic localization engine comprises a geographic localization client module 113, implemented for example in software, which is adapted to exploit the services provided by a geographic localization platform 115 in order to localize, i.e. assign a position to, the captured network events, providing as a result geographically-localized network events, which are then stored in a database 117. The geographic localization platform 115 includes a server software that implements a geographic localization algorithm; suitable geographic localization platforms are described for example in WO 2002/43428 and WO 2003/49479, both in the name of the present Applicant; the geographic localization platform 115, exploiting network data 119 including the locations of the network's transceiver stations, their power, antennas' radiation patterns, and measures performed by the mobile terminals on the field and communicated to the network, is capable of accurately localizing the network events from the geographical viewpoint, for example in terms of area elements (pixels). A statistical indicators calculator 121 retrieves from the database 117 the geographically-localized network events, and processes them to derive statistical indicators; the statistical indicators derived by the statistical indicators calculator 121 include statistical indicators related to the different network cells (non-localized statistical indicators) and statistical indicators related to the geographic area elements (pixels) of the geographic area covered by the network (localized statistical indicators). The statistical indicators obtained are stored in a statistical indicators database 123.

In particular, in an embodiment of the present invention the statistical indicators calculator 121 includes several software modules, among which:

- an extractor module adapted to extract and filter the geographically-localized network events stored in the database 117 according to predetermined filtering criteria, for example in respect of selected time intervals;
- a measure data driver module, adapted to translate files related to the measures of the geographically-localized network events into a predetermined format, for example a format compatible with an automated network planning tool, like for example the planning tool described in WO 2002/35872 in the name of the present Applicant, which is incorporated herein by reference;
- processing modules, specifically designed for processing the geographically-localized network events in order to derive the cell- and pixel-related statistical indicators.

In the statistical indicators database 123, the statistical indicators may be stored in the form of raster layers, i.e. territory maps, subdivided into area elements (pixels), e.g. each one corresponding to a square of 50 m by 50 m. To each pixel of the territory maps, a numerical value, e.g. an integer, is associated, which represents the information associated with the pixel. Each raster layer in the statistical indicators database 123, i.e. the set of numerical values associated with the pixels of the territory represented by means of the raster layer, may be related to a respective time interval (day, week) and contains information related to a respective network event captured.

The statistical indicators in the database 123 are exploited by a server, e.g. a software 125, which may in particular comprise a first module adapted to extract from the database 123 the statistical indicators, and a second module adapted to interface with a database 128 where data calculated by the automated network planning tool (schematically indicated as a block 137) are stored, to extract selected data therefrom.

The database 128 is for example a relational database. The following data may in particular be stored in the database 128:

- geographic information, for example in the form of raster and vectorial maps, of the territory of a state and/or of a geographic region; in particular, these raster maps may specify, for each pixel of the territory, a level of urbanization density, indicating a density of buildings in that pixel (this information is useful for example for discriminating among different types of geographic zones, like for example rural areas, suburban areas, urban areas and highly dense urban areas);
- network radio parameters (like cells' positions, transmission power, azimuth, antennas' types) necessary to the planning tool 137 for the automated planning of the radio access network;
- performance indicators resulting from simulations of the network conducted by the automated network planning tool 137, like for example the one described in the above-cited WO 2002/35872; the performance indicators may in particular include:
- raster maps specifying the (identifiers of the) best server cells for the different pixels (the best server cell in a pixel is the network cell whose signal is the strongest in the considered pixel, calculated for example considering the CPICH, for a UMTS network, or the BCCH—Broadcast Control Channel—for a GSM network);
- raster maps specifying, for each pixel, the strength of the signal of the best server cell in that pixel (calculated for example considering the CPICH for a UMTS network, and the BCCH for a GSM network);

in the case of a UMTS network:
- Echo values in respect of the CPICH (the Echo value is calculated as $$Ec/Io = \frac{RSCP}{RSSI}$$

where RSCP (Received Signal Code Power) gives the power level of the signal received by the mobile terminal and corresponding to the CPICH of the best server cell in the considered pixel, and RSSI (Received Signal Strength Indication) gives the power level, in the considered pixel, of all the signals received by the mobile terminal, including thermal noise);
- pilot pollution (considering the generic pixel, the pilot pollution is expressed as the number of cells having RSCP not greater than a macrodiversity threshold MD compared to the RSCP of the best server cell in the pixel, said number of cells exceeding the maximum Number—the so-called "Active Set size"—of transceiver stations that a generic mobile terminal can manage in macrodiversity and which have Ec/Io equal to or greater than a predetermined threshold Qt, below which the mobile terminal is not able to decode the CPICH); the macrodiversity threshold MD is the maximum difference, expressed in dB, between the RSCP of the best server cell and the RSCP of any other cell, below which threshold the mobile terminal cannot connect to the cells in macrodiversity; —the power required to the mobile terminal for each traffic channel in respect of a generic network service (for example, different maps are generated for different network services);
- the load of each network cell—a measure of the total interference experienced by the cell, expressed as a number ranging from 0, corresponding to a minimum interference, and 1, corresponding to an infinite interference;
- the power required to the serving transceiver station for each traffic channel in respect of a generic network service (for example, different maps are generated for different network services);
- for each cell, a percentage of occupation of a spreading code tree in downlink—a value calculated as the ratio of the number of spreading codes at a spreading factor of 256 used in the cell and the overall number of spreading codes at spreading factor equal to 256 available in the cell;

in the case of a GSM network:
- C/I in respect of the BCCH—a value of the C/I for the BCCH in downlink, calculated as the ratio of the power, received from the BCCH carrier of the best server cell for the considered pixel, and the overall power received in the considered pixel by all the other cells that use the same BCCH carrier;
- average C/I—a value of the average C/I calculated for all the carriers assigned to the best server cell of the considered pixel, where the C/I value for the generic carrier assigned to the best server cell is calculated as above;

worst C/I—a value of the worst C/I among those calculated for all the carriers assigned to the best server cell of the considered pixel.

The server software 125 interacts with and provides services to a diagnostic system 127. The diagnostic system 127 exploits the statistical indicators stored in the database 123 and provided thereto by the server software 125, together with information calculated by the automated network planning tool 137 and stored in the database 128; these data may for example include the network area coverage, lists of best servers in the respective geographic areas, Interference Matrices (IM). The server software 125 may, in some practical embodiments of the present invention, be integrated in the network planning tool 137.

The diagnostic system 127 is adapted to perform a diagnosis of the network status, and to generate diagnostic indicators useful to identify possible network criticalities.

In particular, the diagnostic system 127 may comprise:
- a client module adapted to interact with the server 125 in order to obtain (exploiting the services offered by the server 125) the statistical indicators stored in the database 123, and the data stored in the database 128 resulting from the automated network simulation, like for example the network area coverage, the best servers, interference data etc.;
- modules, e.g. implemented in software, specifically designed for processing the statistical indicators provided by the server software 125;
- modules, e.g. implemented in software, adapted to calculate diagnostic indicators suitable to be used for identifying network's criticalities and for consequently improving the geographic area and service coverage by the network; these modules are in particular adapted to indicate changes to be made to network cells' parameters like the transmission power, the electrical and/or mechanical tilt, the antennas' radiation patterns, and/or to activate/deactivate network cells in order to improve factors like the electromagnetic coverage of the territory, the handling of the traffic related to the different services offered by the network, the level of interference in uplink and of pilot pollution in downlink.

In particular, the diagnostic system 127 may comprise an expert system that, based on the calculated diagnostic indicators, provides a list of network cells that exhibit criticalities, and the cause of such criticalities, like for example interference, area coverage, lost traffic.

The diagnostic system 127 may comprise, in addition to the expert system, a network optimization tool, adapted to exploit the results provided by the expert system to determine the changes to be made to the network configuration. For example, the expert system may provide to the network optimization tool a list of the network cells that exhibit criticalities, and the cells' parameters that may be changed for overcoming the criticalities; the network optimization tool optimizes the network configuration by determining the changes to be made to the cells' parameters indicated by the expert system in respect of the critical cells.

In particular, the diagnostic indicators may be calculated exploiting, for each cell of the network, calls drops.

In the exemplary case of a UMTS network, the diagnostic indicators concerning problems of calls drops may include:
- diagnostic indicators related to the calls drops due to problems of coverage by the CPICH;
- diagnostic indicators of the calls drops due to problems of bad quality of the Ec/Io for the CPICH;
- diagnostic indicators of the calls drops due to problems in respect of the power required to the mobile terminals;
- diagnostic indicators of calls drops due to problems in the downlink power required to the transceiver stations.

In the case of a GSM network, the diagnostic indicators concerning problems of calls drops may include:
- diagnostic indicators of calls drops due to problems of coverage by the BCCH;
- diagnostic indicators of calls drops due to problems of interference on the Traffic Channel (TCH);
- diagnostic indicators of calls drops due to coverage problems.

For each cell of the network, the diagnostic indicators may also be differentiated based on the level of urbanization of the territory of that cell (exploiting the information included in the raster maps of the territory). For each cell, aggregated diagnostic indicators differentiated on the level of urbanization of the different pixels of the cells can also be provided.

In greater detail, in an embodiment of the present invention the diagnostic indicators may be calculated as described hereblow.

The quantities in the database 128 are preferably normalized. Normalization may for example call for associating to the generic quantity a vote ranging for example from 0 to 10. The vote 0 is for example assigned to a range of values that are considered optimum for the corresponding quantity, whereas the vote 10 is assigned to a range of values for the considered quantity that is considered critical. For example, considering the quantity "electromagnetic field level", high levels of the electromagnetic field are assigned a vote 0, whereas low levels of the electromagnetic field are assigned the vote 10 (obviously, other conventions, e.g. the opposite convention may be adopted). Intermediate votes describe situations intermediate between the optimum one and the critical one. FIGS. 2A to 2L depicts exemplary normalization, vote assignment functions that can be exploited to assign votes to the values of some of the quantities that may be present in the database 128.

Figure 2A:
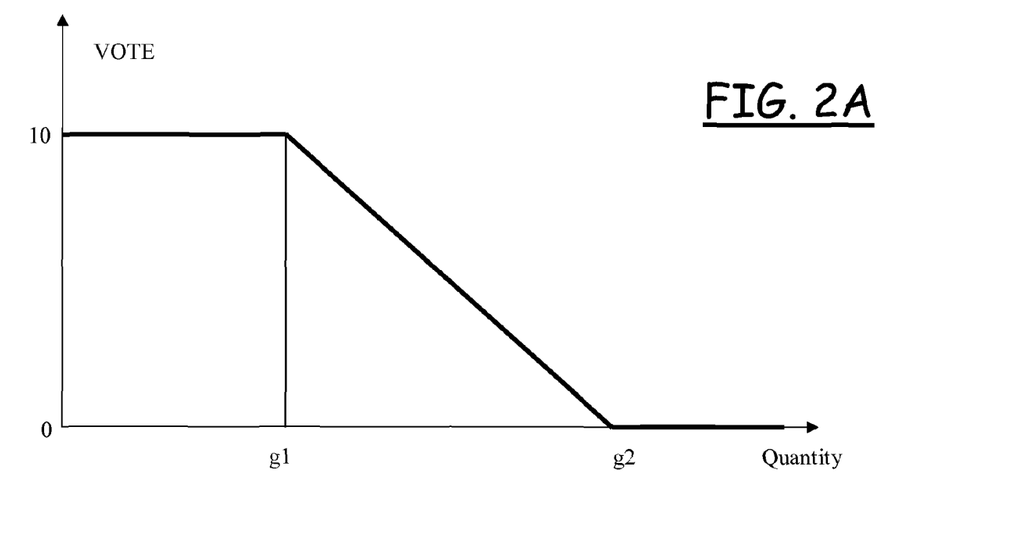

In particular, the normalizing function depicted in FIG. 2A, having a linearly decreasing trend down to a saturation value, can be used to assign a vote to the values of the quantity expressing the electromagnetic field level of the CPICH, which is reported in abscissa, and may be expressed in dBm; the thresholds g1 and g2 may for example be equal to −115 dBm and −46 dBm, respectively.

Figure 2B:
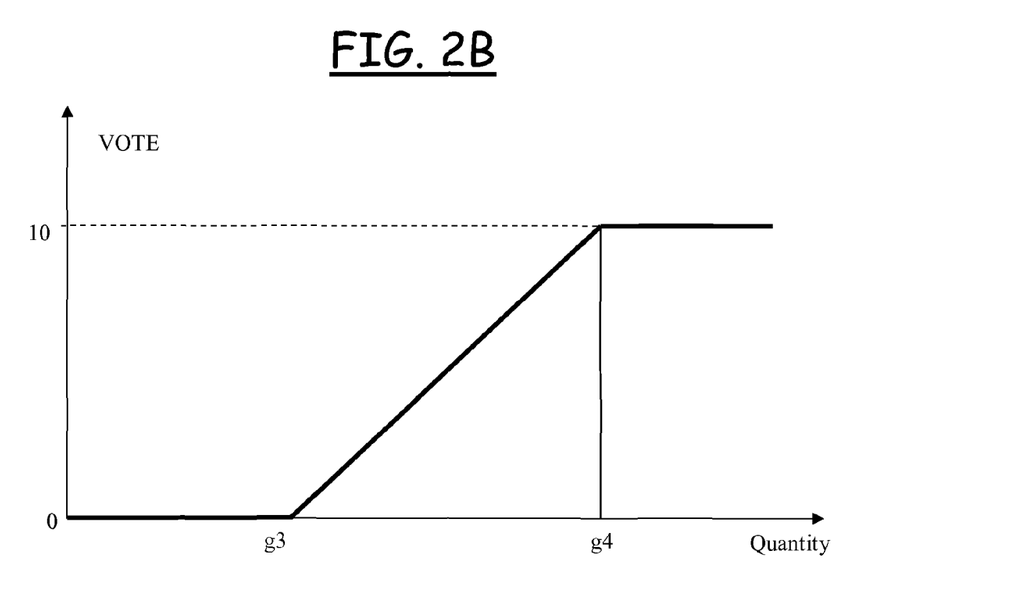

The normalizing function depicted in FIG. 2B, having a linearly increasing trend up to a saturation value, can be used to assign a vote to the values of the quantity expressing the pilot pollution, which is reported in abscissa, and is expressed in terms of integer numbers; the thresholds g3 and g4 may for example be equal to 1 and 8, respectively.

Figure 2C:
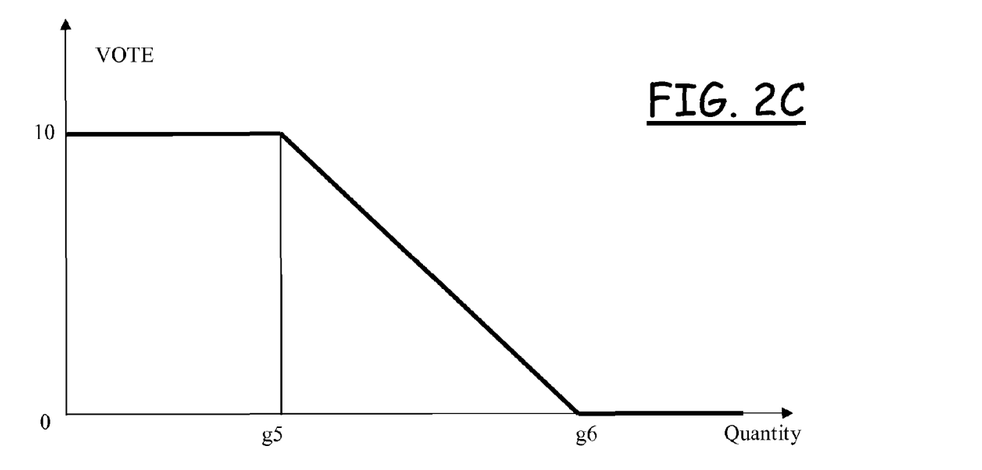

The normalizing function depicted in FIG. 2C, having a linearly decreasing trend down to a saturation value, can be used to assign a vote to the values of the quantity expressing the Ec/Io, which is reported in abscissa, and is expressed in dB; the thresholds g5 and g6 may for example be equal to −18 dB and −12 dB, respectively.

Figure 2D:
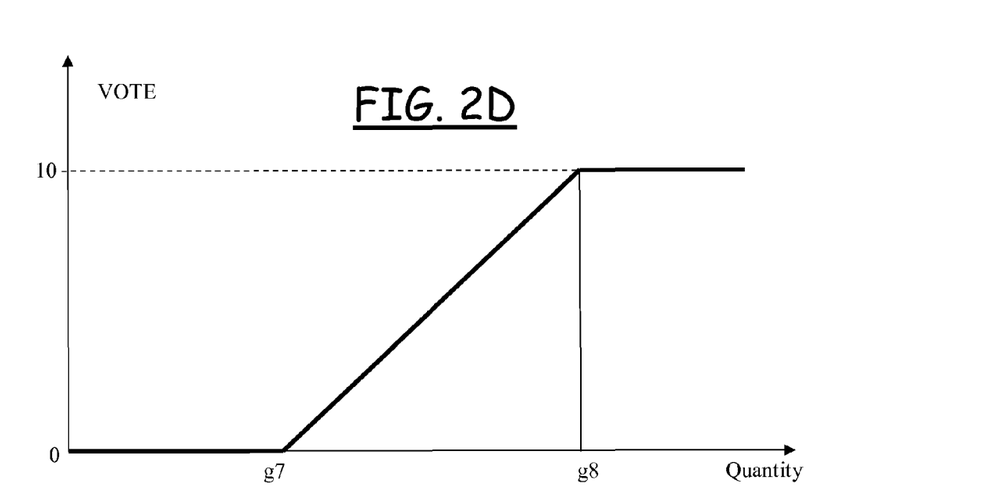

The normalizing function depicted in FIG. 2D, having a linearly increasing trend up to a saturation value, can be used to assign a vote to the values of the quantity expressing the power required to the mobile terminals in uplink, which is reported in abscissa, and is expressed in dBm; the thresholds g7 and g8 may for example be equal to −10 dBm and 18 dBm, respectively.

Figure 2E:
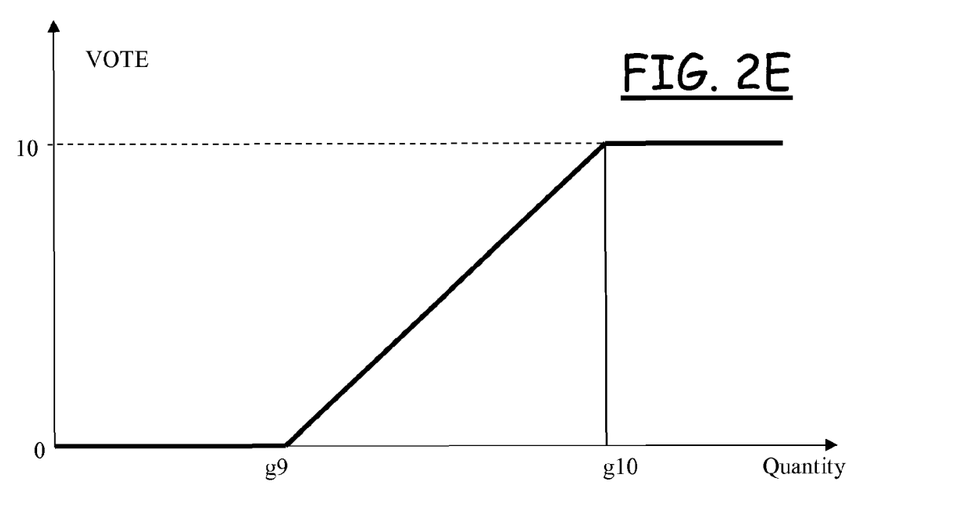

The normalizing function depicted in FIG. 2E, having a linearly increasing trend up to a saturation value, can be used to assign a vote to the values of the quantity expressing the power required to the transceiver station in downlink, which is reported in abscissa, and is expressed in dBm; the thresholds g9 and g10 may for example be equal to 15 dBm and 33 dBm, respectively.

Figure 2F:
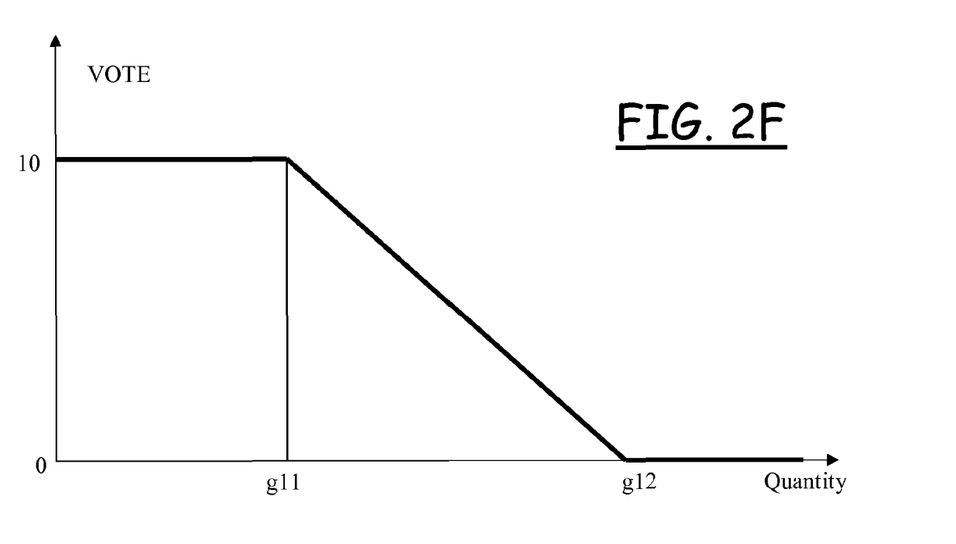

The normalizing function depicted in FIG. 2F, having a linearly decreasing trend down to a saturation value, can be used to assign a vote to the values of the quantity expressing the power level of the BCCH, which is reported in abscissa, and is expressed in dBm; the thresholds g11 and g12 may for example be equal to −115 dBm and −46 dBm, respectively.

Figure 2G:
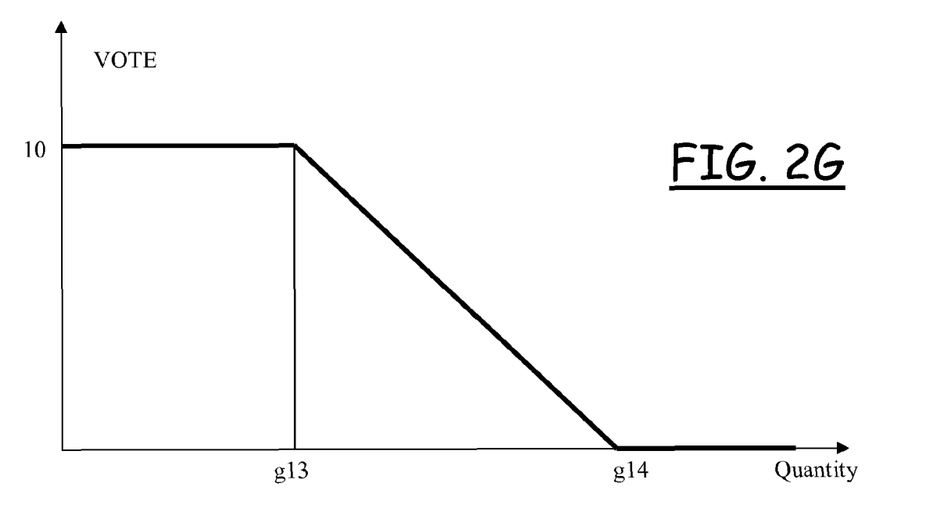

The normalizing function depicted in FIG. 2G, having a linearly decreasing trend down to a saturation value, can be used to assign a vote to the values of the quantity expressing the C/I of the BCCH carrier, which is reported in abscissa, and is expressed in dB; the thresholds g13 and g14 may for example be equal to 12 dB and 16 dB, respectively.

Figure 2H:
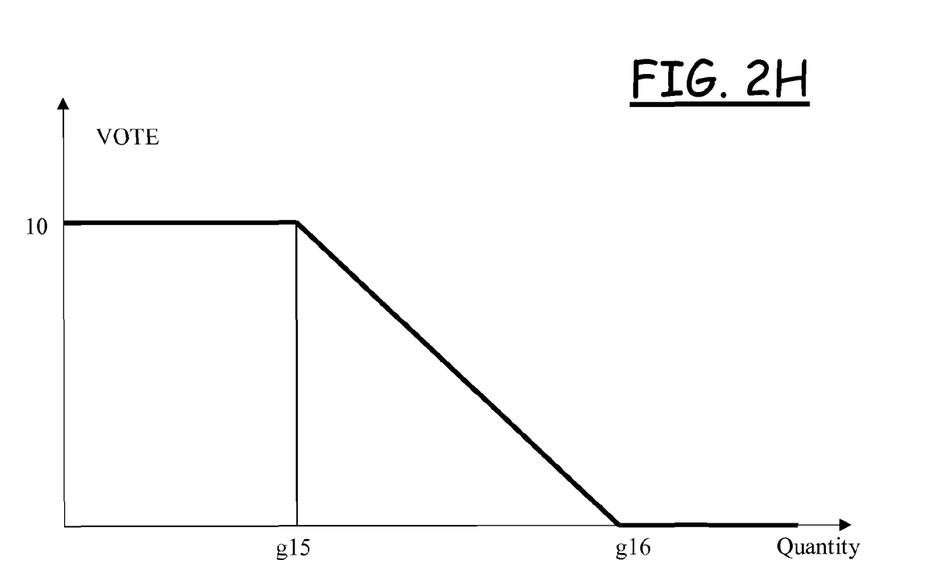

The normalizing function depicted in FIG. 2H, having a linearly decreasing trend down to a saturation value, can be used to assign a vote to the values of the quantity expressing the average C/I, which is reported in abscissa, and is expressed in dB; the thresholds g15 and g16 may for example be equal to 7 dB and 12 dB, respectively.

Figure 2L:
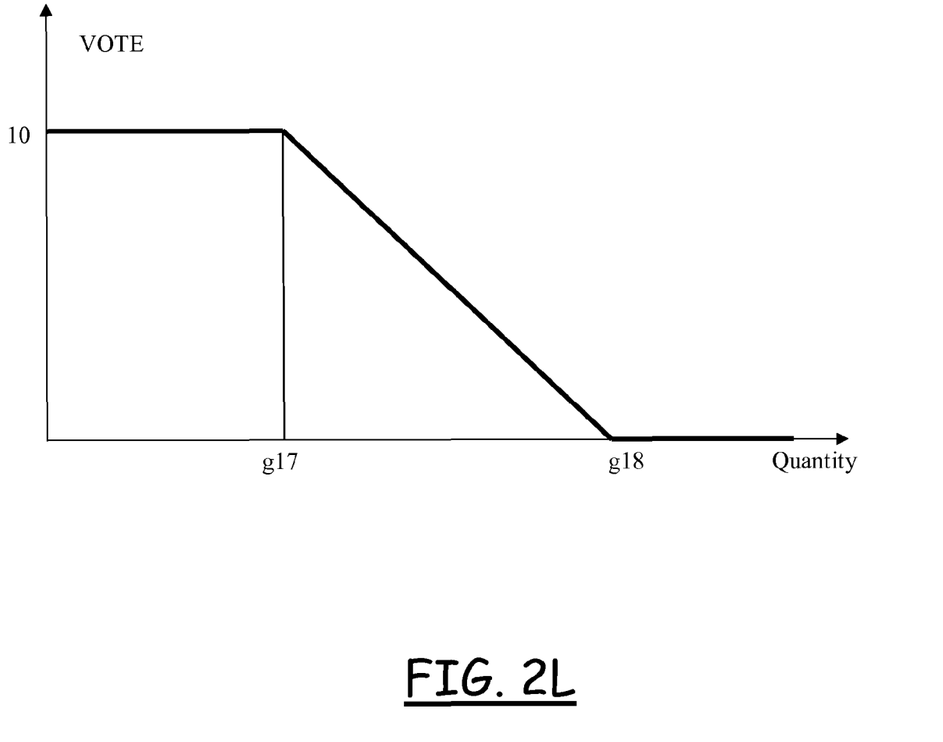

The normalizing function depicted in FIG. 2L, having a linearly decreasing trend down to a saturation value, can be used to assign a vote to the values of the quantity expressing the worst C/I, which is reported in abscissa, and is expressed in dB; the thresholds g17 and g18 may for example be equal to 0 dB and 6 dB, respectively.

In the following, a procedure for upgrading the wireless mobile telephony network according to an embodiment of the present invention is described in terms of its main steps. For the sake of simplicity, it will be assumed, by way of example, that the network upgrading is directed to overcome problems of calls drops evidenced by the wireless mobile telephony network; in particular, the description will explain how one of the possible diagnostic indicators related to calls drops is calculated, for example the diagnostic indicator related to calls drops due to problems of interference on the BCCH is to be calculated; this diagnostic indicator correlates the indication about the measured calls drops, geographically-localized and stored in the database 123, with data obtained from the network planning tool and stored in the database 128 giving a BCCH C/I map. It is pointed out that a similar procedure can be followed to calculate other diagnostic indicators, and to other network events. Reference is made to the schematic flowchart of FIG. 3.

Figure 3:
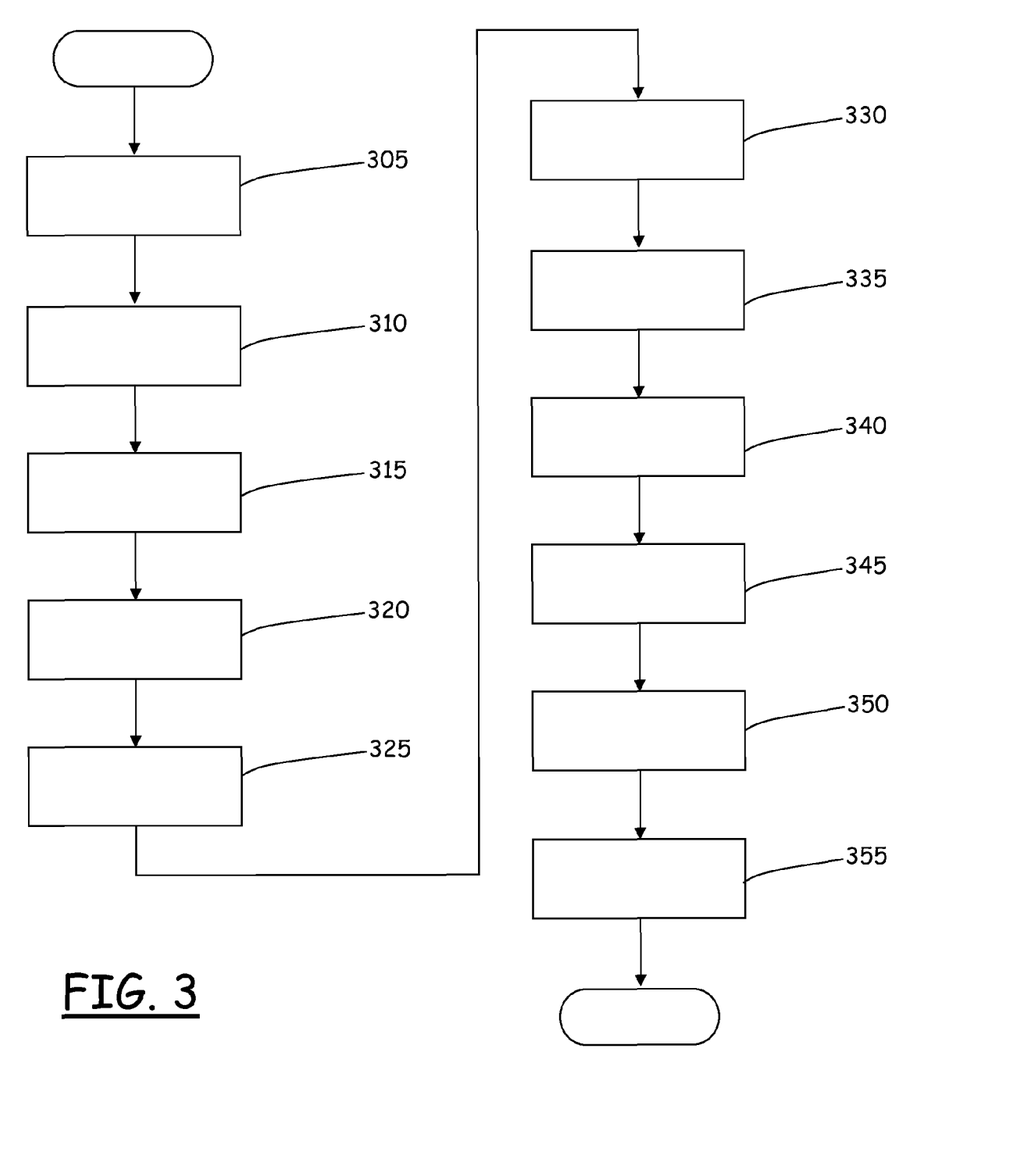
FIG. 3 schematically shows a flowchart with the main steps of a method according to an embodiment of the present invention, actuated by the system of FIG. 1, for upgrading a wireless mobile communications network.

Network events are captured by the transducers 109 and stored in the database 111 (block 305). Preferably, the captured network events are geographically localized, exploiting the localization platform 115, and the geographically-localized network events are stored in the database 117 (block 310).

The statistical indicators calculator 121 calculates statistical indicators in respect of the captured (and geographically localized) network events, and stores the calculated statistical indicators in the database 123 (block 315). In particular, statistical indicators related to calls drops are calculated.

Considering network simulation data calculated by the automated network planning tool 137 and stored in the database 128, from the data in the database 128 specifying the best server cell (considering the BCCH) in the considered pixel/cell, indications about the BCCH C/I are retrieved from the database 128 by the server 125 (block 320). Making discrete, in the considered example, the range of values within which the BCCH C/I can vary is done (block 325). This operation may be performed by the server 125, or by the diagnostic system 127. In detail, the range of values within which the BCCH C/I can vary is divided in sub-intervals, for example the following four C/I values intervals:

first sub-interval: BCCH C/I values from −∞ to 7 dB;
second sub-interval: BCCH C/I values from 7 dB to 9 dB;
third sub-interval: BCCH C/I values from 9 dB to 15 dB;
fourth sub-interval: BCCH C/I values from 15 dB to +∞.

A normalization process is then performed to assign to each sub-interval a respective vote in the range of votes from 0 to 10 (block 330); for example, using the function of FIG. 2G, the vote assignment may be the following:

first sub-interval: vote 10;
second sub-interval: vote 7;
third sub-interval: vote 2;
fourth sub-interval: vote 0.

Then, the statistical indicators related to the measured calls drops are retrieved from the database 123 (block 335).

A statistic of the experienced calls drops as a function of the BCCH C/I values (normalized as discussed before) is then calculated (block 340), for example by counting the number of measured calls drops that fall in each of the sub-intervals defined above for the BCCH C/I values. For example, let it be assumed that, in the generic network cell, the number of calls drops that fall in the first sub-interval of the BCCH C/I values (having been assigned vote 10) is 80, the number of calls drops that fall in the second sub-interval (having been assigned vote 7) is 23, the number of calls drops that fall in the third sub-interval (having been assigned vote 2) is 12, and the number of calls drops that fall in the fourth sub-interval (having been assigned vote 0) is 3.

The value of the diagnostic indicator is calculated as follows:

$$ID_j(\text{sim\_data}, \text{stat\_ind}) = \frac{\left( \sum_{i \in \text{Sub-intervals\_sim\_data}} \text{Values\_stat\_ind}_i^j * \text{Vote\_sim\_data}_i \right)}{\sum_{i \in \text{Sub-intervals\_sim\_data}} \text{Values\_stat\_ind}_i^j}$$

wherein j denotes the considered network cell, sim_data denotes the values obtained as a result of the network simulation performed by the automated planning tool, stat_ind denotes the statistical indicator considered, and/is an index for the sub-intervals into which the range of values of the simulation data sim_data is subdivided. The above formula gives, in the example herein considered, a value of 8.34, indicating a high degree of correlation between low C/I values and number of calls drops measured in the area of the generic cell j.

The diagnostic indicators calculated by the module 127 provides an indication of the degree of correlation between the measured network events and network characteristics obtained by simulating the network using an automated network planning tool.

The value $ID_j$ (sim_data, stat_ind) may also be calculated differentiated on the basis of the level of urbanization in the different area portions of the considered network cell j, and possibly restricted to a selected time interval. A more general form of the generic diagnostic indicator may be the following: $ID_j$ (sim_data$_i$, stat_ind$_k$, Class$_l$, t), where Class identifies the level of urbanization, and t identifies a time interval.

The diagnostic indicators calculated by the module 127 are stored in a database 131 (block 345).

Based on the calculated diagnostic indicators, the (expert system of the) diagnostic module 127 may provide a list of network cells that exhibit criticalities, and whose parameters should be upgraded (350). The network optimization tool of the module 127 determines the changes to be made to the critical cells' parameters.

In order to allow a network manager 133 exploit the indications provided by the diagnostic module 127 to modify the parameters of the deployed network, actuators 135 are provided that interact with the network equipments. The expert system, or the network optimization tool of the diagnostic module 127 might also directly send to the actuators the instructions for implementing the upgrades suitable to overcome the detected network criticalities. Also, the expert system of the diagnostic module 127 may learn from previous actions undertaken to overcome network criticalities detected in the past.

The configuration (i.e. cells' parameters) of the wireless communications network is then upgraded (block 355).

The above procedure, described making reference to the problems of calls drops, may be applied to different types of network's events.

The present invention has been here described presenting some possible embodiments thereof, however several modifications to the described embodiments and other embodiments of the invention are possible, without departing from the scope of protection defined in the appended claims.

The invention claimed is:

1. A method of upgrading a wireless mobile communications network, comprising:
    capturing network events from the wireless mobile communications network;
    obtaining network simulation data from an automated network simulation planning tool;
    making discrete values of said network simulation data, wherein said making comprises:
        determining a range of values for at least one of a received signal strength and signal-to-noise ratio of a simulated signaling channel from said network simulation data; and
        dividing the range of values into a plurality of discrete sub-intervals;
    comparing, by a computing device, the captured network events to the discrete values of said network simulation data to calculate degrees of correlation between the captured network events and the discrete values of said network simulation data and derive diagnostic indicators that evidence criticalities in a current network configuration; and
    modifying the current network configuration to overcome the criticalities.

2. The method of claim 1, further comprising calculating network events statistical indicators based on the captured network events, and wherein said comparing comprises comparing the discrete values of said network simulation data with the calculated statistical indicators.

3. The method of claim 2, further comprising localizing, in a geographic area covered by the wireless mobile communications network, the captured network events, and wherein said calculating network events statistical indicators comprises using geographically-localized captured network events.

4. The method of claim 3, wherein said localizing the captured network events comprises determining an elementary area of the geographic area covered by the wireless mobile communications network where the captured network events occurred.

5. The method of claim 1, further comprising normalizing the discrete values of said network simulation data, wherein said normalizing comprises:
    determining a number of simulated network events occurring within each of the discrete sub-intervals; and
    assigning, to each of the discrete sub-intervals, a vote corresponding to the determined number of simulated network events occurring within the discrete sub-interval.

6. The method of claim 1, wherein said network events comprise one or more among call drops, lost calls, network traffic, and handovers from a cell to another cell.

7. The method of claim 1, wherein said diagnostic indicators are calculated in respect of area elements of a geographic area covered by the wireless mobile communications network.

8. The method of claim 7, wherein said diagnostic indicators are differentiated based on an indication of a level of urbanization of an area covered by the wireless mobile communications network.

9. The method of claim 8, wherein aggregated diagnostic indicators in respect of areas covered by network cells are calculated.

10. A system for upgrading a wireless mobile communications network, comprising:
    a processor; and
    memory storing computer-readable instructions that, when executed by the processor, cause the system to:
        obtain network events captured from the wireless mobile communications network;
        obtain network simulation data from an automated network simulation planning tool;
        make discrete values of said network simulation data, wherein said making comprises:
            determining a range of values for at least one of a received signal strength and signal-to-noise ratio of a simulated signaling channel from said network simulation data; and
            dividing the range of values into a plurality of discrete sub-intervals;
        compare the captured network events to the discrete values of said network simulation data to calculate degrees of correlation between the captured network events and the discrete values of said network simulation data and derive diagnostic indicators that evidence criticalities in a current network configuration; and
        cause the current network configuration to be modified to overcome the criticalities.

11. The system of claim 10, wherein the memory stores additional computer-readable instructions that, when executed by the processor, cause the system to calculate network events statistical indicators based on the captured network events, to be compared with the discrete values of said network simulation data.

12. The system of claim 10, wherein the memory stores additional computer-readable instructions that, when executed by the processor, cause the system to localize, in a geographic area covered by the wireless mobile communications network, the captured network events.

13. The system of claim 12, wherein the memory stores additional computer-readable instructions that, when executed by the processor, cause the system to determine an elementary area of a geographic area covered by the wireless mobile communications network where the captured network events occurred.

14. The system of claim 10, wherein the memory stores additional computer-readable instructions that, when executed by the processor, cause the system to normalize the discrete values of said network simulation data, wherein said normalizing comprises:

determining a number of simulated network events occurring within each of the discrete sub-intervals; and assigning, to each of the discrete sub-intervals, a vote corresponding to the determined number of simulated network events occurring within the discrete sub-interval.

15. The system of claim 10, wherein said network events comprise one or more among call drops, lost calls, network traffic, and handovers from a cell to another cell.

16. The system of claim 10, wherein said diagnostic indicators are calculated in respect of area elements of a geographic area covered by the wireless mobile communications network.

17. The system of claim 16, wherein said diagnostic indicators are differentiated based on an indication of a level of urbanization of an area covered by the wireless mobile communications network.

18. The system of claim 17, wherein aggregated diagnostic indicators in respect of areas covered by network cells are calculated.

19. The method of claim 5, wherein comparing the captured network events to the discrete values of said network simulation data to calculate degrees of correlation between the captured network events and the discrete values of said network simulation data comprises comparing the captured network events to the normalized discrete values of said network simulation data to calculate degrees of correlation between the captured network events and the normalized discrete values of said network simulation data.

20. The system of claim 14, wherein comparing the captured network events to the discrete values of said network simulation data to calculate degrees of correlation between the captured network events and the discrete values of said network simulation data comprises comparing the captured network events to the normalized discrete values of said network simulation data to calculate degrees of correlation between the captured network events and the normalized discrete values of said network simulation data.

* * * * *